(12) United States Patent
Degroot et al.

(10) Patent No.: US 9,739,328 B1
(45) Date of Patent: Aug. 22, 2017

(54) IMPACT ATTENUATOR AND VEHICLE, TRAILER AND GUARDRAIL COMPRISING SUCH AN IMPACT ATTENUATOR

(71) Applicant: Verdegro Holding B.V., Etten-Leur (NL)

(72) Inventors: Sjoerd Degroot, Roosendaal (NL); Gerrit Verwijs, Roosendaal (NL)

(73) Assignee: Verdegro Holding B.V. (NL)

( * ) Notice: Subject to any disclaimer, the term of this patent is extended or adjusted under 35 U.S.C. 154(b) by 0 days.

(21) Appl. No.: 15/043,232

(22) Filed: Feb. 12, 2016

(51) Int. Cl.
| | |
|---|---|
| *E01F 15/00* | (2006.01) |
| *F16F 7/12* | (2006.01) |
| *B62D 21/15* | (2006.01) |
| *B62D 63/06* | (2006.01) |
| *E01F 15/04* | (2006.01) |
| *E01F 15/14* | (2006.01) |

(52) U.S. Cl.
CPC ............ *F16F 7/123* (2013.01); *B62D 21/152* (2013.01); *B62D 63/062* (2013.01); *E01F 15/04* (2013.01); *E01F 15/146* (2013.01); *F16F 2230/0023* (2013.01)

(58) Field of Classification Search
CPC ........... E01F 13/12; E01F 15/00; B64F 1/305; B62D 21/152; B62D 63/062; F16F 7/123; F16F 2230/0023
USPC .............................. 404/6; 256/13.1; 280/784
See application file for complete search history.

(56) References Cited

U.S. PATENT DOCUMENTS

| | | | | | |
|---|---|---|---|---|---|
| 716,880 | A | * | 12/1902 | Flynn ...................... | B61L 11/02 246/264 |
| 3,982,734 | A | * | 9/1976 | Walker ................... | E01F 15/146 256/13.1 |
| 4,200,310 | A | * | 4/1980 | Carney, III ............. | B60R 19/00 188/377 |
| 4,674,911 | A | * | 6/1987 | Gertz ...................... | F16F 9/049 256/13.1 |
| 5,217,318 | A | * | 6/1993 | Peppel ................... | E01F 15/146 256/13.1 |
| 5,391,016 | A | * | 2/1995 | Ivey ....................... | E01F 15/143 256/13.1 |
| 5,597,055 | A | * | 1/1997 | Han ........................ | F16F 7/126 188/371 |
| 5,947,452 | A | * | 9/1999 | Albritton ................ | B60R 19/00 256/13.1 |
| 6,092,959 | A | * | 7/2000 | Leonhardt ............... | B60R 19/00 256/13.1 |

(Continued)

*Primary Examiner* — Raymond W Addie
(74) *Attorney, Agent, or Firm* — Varnum Riddering, Schmidt & Howlett LLP

(57) ABSTRACT

An impact attenuator including an impact head, coupled to a first end of an energy absorption body, which energy absorption body is arranged for fixation to an external structure at a second end opposing the first end of the energy absorption body, configured to at least partly absorb or dissipate energy from a collision of an object with the impact head, and including a first part and a second part extending substantially lengthwise behind each other, wherein the first and second part are mutually moveable and including a first and a second cutting edge, wherein, the first cutting edge is arranged for splitting the first part of the energy absorption body upon impact of an object colliding with the impact head, and the second cutting edge is arranged for consecutively splitting the second part of the energy absorption body upon impact of an object colliding with the impact head.

14 Claims, 7 Drawing Sheets

(56) References Cited

U.S. PATENT DOCUMENTS

| | | | | |
|---|---|---|---|---|
| 6,668,989 | B2* | 12/2003 | Reid | E01F 15/148 |
| | | | | 188/377 |
| 7,722,284 | B1* | 5/2010 | Somwong | E01F 15/146 |
| | | | | 404/6 |
| 8,074,761 | B2* | 12/2011 | LaTurner | E01F 15/148 |
| | | | | 180/274 |
| 8,388,259 | B2* | 3/2013 | Amengual Pericas | E01F 15/143 |
| | | | | 188/374 |
| 8,465,047 | B2* | 6/2013 | Groeneweg | E01F 15/148 |
| | | | | 280/404 |
| 2003/0175076 | A1* | 9/2003 | Albritton | E01F 15/146 |
| | | | | 404/6 |
| 2005/0141960 | A1* | 6/2005 | Schiefferly | E01F 15/148 |
| | | | | 404/6 |
| 2006/0054876 | A1* | 3/2006 | LaTurner | E01F 15/146 |
| | | | | 256/13.1 |
| 2011/0091273 | A1* | 4/2011 | Sayre | C08G 18/10 |
| | | | | 404/6 |
| 2011/0255916 | A1* | 10/2011 | Thompson | E01F 15/146 |
| | | | | 404/6 |
| 2015/0225913 | A1* | 8/2015 | Groeneweg | E01F 15/148 |
| | | | | 212/299 |

\* cited by examiner

IMPACT ATTENUATOR AND VEHICLE, TRAILER AND GUARDRAIL COMPRISING SUCH AN IMPACT ATTENUATOR

TECHNICAL FIELD

The following specification relates to an impact attenuator for roadside application, suited for reducing the severity of a collision by absorbing at least part of the kinetic energy of an object, and specifically a vehicle, colliding with said impact attenuator. The specification furthermore relates to a vehicle comprising such an impact attenuator, a trailer comprising such an impact attenuator and a guardrail comprising such an impact attenuator.

SUMMARY

Roadside impact attenuators are intended to reduce the damage to vehicles, structures and motorists in the event of a (motor) vehicle collision by absorbing the colliding vehicle's kinetic energy. Common impact attenuators hereby deform, or more specifically split material as a method to dissipate kinetic energy. To split the material, a cutting surface is installed and configured to cut into the attenuator structure upon impact of a colliding vehicle. In common cases, the cutting surface hereby progressively splits a steel box beam in its lengthwise direction from the moment of impact up till the standstill of the vehicle. For safety reasons, it is desirable to increase the length over which the attenuator structure is split, as to lengthen the deceleration time for the vehicle as much as possible to minimize the deceleration (G-forces) experienced by the passengers. This means that, from a safety perspective, the attenuator structure must as long as practically possible. However, the total length of the impact attenuator is limited due to transportation requirements. Especially attenuators suited for temporary use in road construction projects or truck mounted attenuators are frequently transported and need to conform to the height, width and length requirements set for road transport.

An object of the specification is therefore to provide an impact attenuator that offers improved safety, better transportability and/or at least provides a useful alternative to the state of the art.

SUMMARY

The specification hereto proposes an impact attenuator comprising: an impact head, coupled to; a first end of an energy absorption body, which energy absorption body is arranged for fixation to an external structure at a second end opposing the first end of the energy absorption body, configured to at least partly absorb or dissipate energy from a collision of an object with the impact head, and comprising a first part and a second part extending substantially lengthwise behind each other, wherein the first and second part are mutually moveable; a first and a second cutting edge, wherein upon impact of an object colliding with the impact head, the first cutting edge is arranged for splitting the first part of the energy absorption body, and the second cutting edge is arranged for consecutively splitting the second part of the energy absorption body.

The impact attenuator according to the specification thus comprises an energy absorption body that extends between the impact head and an external structure, which energy absorption body is specifically configured for being cut into and consequently split by the cutting edges. Upon collision of an object with the impact head, the energy absorption body absorbs at least part of the kinetic energy of the colliding object. Consecutively, the absorbed energy is (at least partly) dissipated by the splitting action of the cutting edges, which plastically deforms the energy absorption body and causes friction that generates thermal energy (heat).

By dividing the energy absorption body into multiple parts that are moveable with respect to each other, it becomes possible to extend the energy absorption body to its fullest length by letting the individual parts of the energy absorption body extend substantially behind each other in a lengthwise direction. This creates a maximum distance between the impact head and the external structure with which the impact attenuator is coupled, improving the attenuator's inherent safety. Namely, the increase in the distance over which the object is decelerated allows for more time for a colliding object to come to rest or change its direction and therefore, which leads to a more gradual deceleration of the colliding object. At the same time, the multiple parts of the energy absorption body can be moved to a different mutual orientation in which the maximum length of the impact attenuator is reduced to allow for convenient transportation. It is for example possible to remove, fold or retract the individual parts such that the total of parts constituting the impact attenuator adhere to certain predetermined maximum dimensions.

To ensure the continuous and subsequent splitting of the energy absorption body over its (entire) length, the impact attenuator comprises multiple (at least two) cutting edges, which cutting edges may be part of one or more cutting means. The cutting edges are positioned such that the multiple parts of the energy absorption body are separately and subsequently split by separate cutting edges that are part of either the same or separate cutting means. This creates essentially self-contained parts of the energy absorption body that work independently, making the assembly of said parts fail-safe to at least a certain degree. Moreover, the interface between the separate parts of the energy absorption body, which may create a discontinuity in the construction of the energy absorption body, does not hinder a continuous splitting action, due to the separate and consecutive splitting of the individual parts of the energy absorption body.

It is also possible that the energy absorption body comprises more than two parts, to further reduce the minimum dimensions of the impact attenuator when transported or to further increase the maximum distance between the impact head and the external structure to improve the impact attenuator's collision safety.

In a further embodiment the first part and the second part of the energy absorption body are mutually moveable in their lengthwise direction. The direction of mutual movement of the absorption body parts hereby corresponds to the anticipated direction of impact, which ensures that the impact attenuator will behave as predicted in the case of a collision. In addition, relative movement of the energy absorption parts in any other direction may be prevented for similar reasons.

In yet a further embodiment, the first part and the second part of the energy absorption body may be configured for guiding each other during mutual movement of said first part and the second part of the energy absorption body. As the first part and the second part of the energy absorption body act as each other's guiding structure, mutual movement of these parts will take place along a predetermined path in lengthwise direction of the energy absorption body. The relative motion of the individual parts of the energy absorption body is hereby limited to essentially a single degree of freedom (i.e. a translation along a straight path), which makes that the deformation behaviour of the attenuator in the event of a collision becomes more predictable and therefore more safe. Moreover, the guided movement of the energy absorption body parts benefit the easy conversion of the attenuator from an operational to a transport configuration.

Additionally, the energy absorption body may comprise rollers provided between the first part and the second part of the energy absorption body. These rollers reduce friction and facilitate the mutual movement of said first part and the second part of the energy absorption body. Alternatively, a similar reduction in friction could be obtained by the application of materials with a low coefficient of friction along the interface of the first part and the second part of the energy absorption body.

In order to retract the energy absorption body in an efficient way the first cutting edge may be moveable between: an engaged position, wherein the first cutting edge is positioned for splitting the first part of the energy absorption body upon mutual movement the first part and the second part of the energy absorption body, and a retracted position, wherein the first cutting edge is positioned away from the first part of the energy absorption body to allow free mutual movement the first part and the second part of the energy absorption body. The free mutual movement the first part and the second part of the energy absorption body allow for an easy retraction of the impact attenuator in its lengthwise direction, which benefits the transportability of the impact attenuator. Adjustment means may be applied to move the cutting edge (and the associated cutting means) between the engaged and retracted position. Such movement may comprise a rotation or a translation along a path that in part lies within the movement path of the first part of the energy absorption body and in part lies outside the movement path of the first part of the energy absorption body.

The first cutting edge and the second cutting edge may be provided at an end of the second part of the energy absorption body facing towards the impact head. By placing the cutting mechanisms at an end of the second part of the energy absorption body, the cutting mechanisms can commence cutting into the absorption body at the respective ends of the first and second parts of the energy absorption body, in the case that the separate parts of the energy absorption body are fully extended behind each other. This enables the cutting edges to split the energy absorption body over its entire length, making full use of the body's arresting capacities.

It is possible that the first part and the second part of the energy absorption body each comprise a thin-walled beam, which thin-walled beams comprise at least a web and a flange plate. A thin-walled beam can be understood as a beam for which the wall thickness is significantly smaller than the other representative dimensions of the beam's cross-section. The use of one or more thin-walled beams allows the energy absorption body to obtain a high bending stiffness per unit cross sectional area, which is much higher than that for solid cross sections, thereby achieving a stiff beam at a minimum weight. To obtain a stable construction for the energy absorption body, multiple parallel beams may be provided between the impact head and the external structure to form (part of) the first part and/or the second part of the energy absorption body.

In an embodiment of the impact attenuator, the at least one first part of the energy absorption body comprises a H-beam and the at least one second part of the energy absorption body comprises a hollow structural section. The H-beam and hollow structural section type beams give the energy absorption body a high level of strength and stiffness while intact, but can easily be split to obtain a number of elongated, flat plates that can be easily bended.

Given that the energy absorption body may comprise thin-walled beams, the first and second cutting edges may, by means of relative position to the thin-walled beam of the first part and the second part of the energy absorption body, be configured for splitting the thin-walled beams along an interface of a web and flange plate. Splitting the at least one beam along the interface of web and flange plates yield essentially elongated, flat plates that have little remaining stiffness and can therefore be easily bended.

Bendability of the split off parts of the energy absorption body is required for bending the parts, resulting from the splitting operation, in a direction away from the colliding object, the external structure and/or other objects that could otherwise be damaged by these split off parts.

In order to achieve bending of the split off parts of the energy absorption body, at least one first part of the energy absorption body may be provided with at least one deflection surface, which at least one deflection surface is configured for deflecting split off beam plates away from the colliding object. Moreover, the deformation (bending) of the split off beam plates by the deflection surface dissipates, in addition to the splitting, part of the colliding object's kinetic energy.

In an alternative embodiment, one of the first part and second part of the energy absorption body is nested within the other one of the first part or second part of the energy absorption body. This means that the first part of the energy absorption body may be nested within the second part of the energy absorption body to obtain a telescoping construction, internally comprising the first part of the energy absorption structure, and externally comprising the second part of the energy absorption structure. Alternatively, the second part of the energy absorption body may be nested within the first part of the energy absorption body. The telescoping construction allows the energy absorption body to occupy the least amount of space when in a retracted position.

In yet another embodiment, the energy absorption body may comprise an adjustable coupling configured for coupling the impact attenuator to an external structure, wherein the adjustable coupling allows adjustment of the angle enclosed between the energy absorption body and the external structure. With the possibility to adjust the angle enclosed between the energy absorption body and the external structure, it becomes possible to set the orientation of the impact attenuator such that it extends parallel to the road surface.

The specification also relates to a vehicle provided on a rear side thereof with an impact attenuator according to the present specification, which impact attenuator is configured to move between: an essentially horizontal position, wherein the impact attenuator extends substantially parallel to a road surface, and an essentially vertical position, wherein the impact attenuator is folded behind the vehicle. In a common instance, said vehicle is a road construction or maintenance truck that is especially prone to collide with passing traffic. By mounting and deploying the impact attenuator at the rear side of the vehicle, an impact barrier is created between said vehicle and traffic approaching from the rear. In addition, the impact attenuator could also be deployed at the front side of a vehicle, to create an impact barrier in case of a frontal collision. To minimize the length of the vehicle when the impact attenuator is not in use as a roadside barrier, the impact attenuator can be folded behind the vehicle in a essentially vertical position. A hydraulic system may for example be used for rotating or otherwise moving the attenuator to and from a folding position.

In addition, the specification relates to a trailer comprising an impact attenuator according to the present specification, wherein the impact attenuator is disposed on at least one axle provided with a set of wheels. The impact attenuator itself may act as a chassis onto which one or more axles are installed. An advantage of using such trailer as a temporary roadside barrier, is that the impact attenuator may be used behind a variety of vehicles. Additionally, the trailer may be used as a stand-alone roadside barrier, wherein the trailer is not coupled to any vehicle. In the case of stand-alone use, the trailer may be equipped with additional weights to act as a ballast.

Last, the specification relates to a guardrail, provided on a front end thereof with an impact attenuator according to the present specification. Such guardrail equipped with an impact attenuator is specifically suited for use at a head piece of a guardrail, for example between a highway and an exit lane, along the most probable line of impact. Hereby, the guardrail itself will only act as an external structure with which the impact attenuator is coupled. The impact attenuator may be (more so than the standard guardrail) optimized for different impact scenarios to guarantee an optimal safety for passing traffic. Moreover, the impact attenuator offers an additional line of protection against accidental fails of the guardrail.

BRIEF DESCRIPTION

The specification will now be elucidated into more detail with reference to non-limitative exemplary embodiments shown in the following figures. Corresponding elements are indicated with corresponding numbers in the figures.

DETAILED DESCRIPTION

Figure 1:
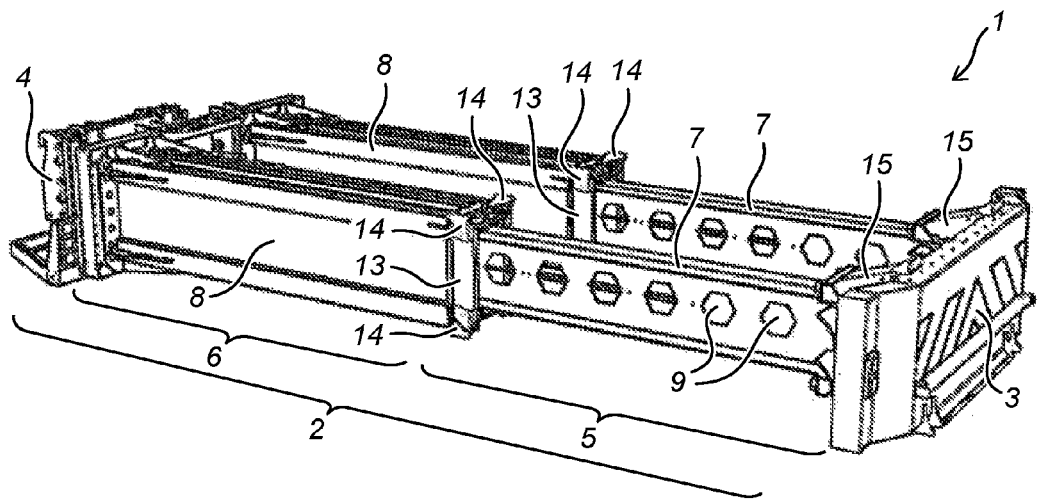
FIG. 1 shows a three-dimensional view of a preferred embodiment of an impact attenuator according to the specification in an extended position.

FIG. 1 shows a three-dimensional view of a preferred embodiment of an impact attenuator 1 according to the specification. The impact attenuator 1 is shown in an extended position, which corresponds to the attenuator's operational configuration. The impact attenuator 1 comprises an energy absorption body 2, on a first end provided with an impact head 3 and on a second end opposing the first end coupled to an external structure by means of an adjustable coupling 4. Although the adjustable coupling 4 as shown here allows specifically for coupling the impact attenuator 1 to trucks or other vehicles, the impact attenuator 1 could also be coupled to or be part of other external structures, not exclusively including trailers (see for example FIG. 2), guardrails (see for example FIG. 10) and ground anchors. The energy absorption body 2 comprises a first part 5 and a second part 6, extending past each other in a lengthwise direction, wherein the first part comprises two H-beam structures 7 and the second part comprises hollow structural sections 8. The H-beams 7 and hollow structural sections 8 can be provided with through-holes 9 in order to reduce the weight of the structure. Even though the energy absorption body 2 comprising two lengthwise extending beams, which leads to a highly stable and stiff structure, it is also possible that the energy absorption body 2 comprises a single beam structure comprising a single first and second part. Alternatively, more than two lengthwise extending beams can be used in the energy absorption body 2. The H-beam sections are configured to slide over rollers 10 (visible in FIGS. 5-7), contained within the hollow structural sections 8, which enables the H-beam sections 7 to move in lengthwise direction with respect to the hollow structural sections 8, thereby performing a telescoping movement. As an alternative to the rollers 10, materials with a low coefficient of friction could be applied along the interface of the H-beam sections 7 and the hollow structural sections 8. First cutting means 11, comprising first cutting edges 12 (shown in FIGS. 6 and 7) and second cutting means 13, comprising second cutting edges 14, are provided at an end of the second part of the energy absorption body 2 opposing the end of the second part connected to the adjustable coupling 4. The first cutting means 11 are hereby configured for splitting the first part 5 of the energy absorption body 2, while the second cutting means 13 are configured for splitting the second part 6 of the energy absorption body 2. Alternatively, the second cutting means 13 could be mounted one a side of the impact head 3 facing the external structure (truck) 4. The impact head 3 is furthermore provided with deflection surfaces 15, which are configured for bending parts of the energy absorption body 2 away from the colliding object after being split-up by the second cutting means 13.

Figure 2:
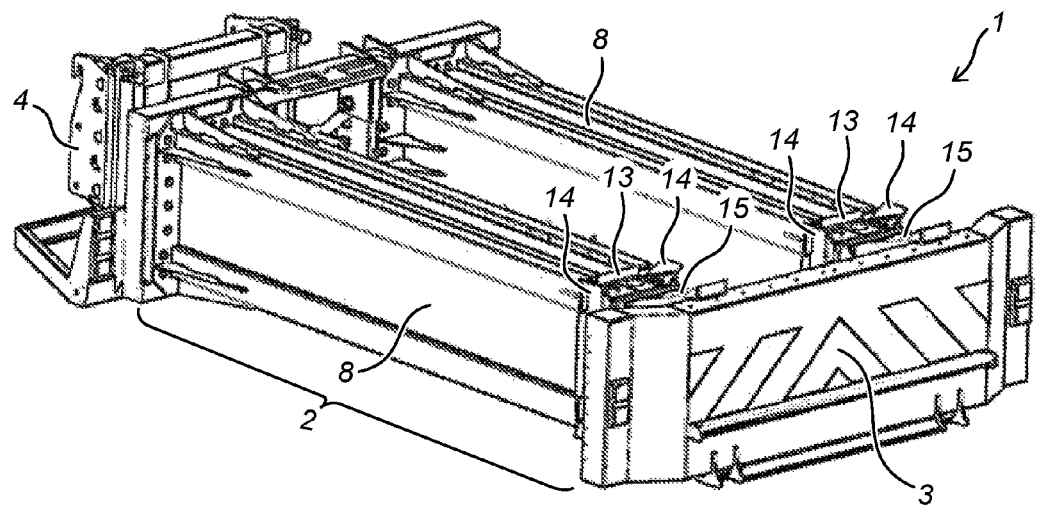
FIG. 2 shows a three-dimensional view of an impact attenuator according to FIG. 1 in a retracted position.

FIG. 2 shows a three-dimensional view of an impact attenuator 1 according to FIG. 1, now depicted in a retracted position, which corresponds to the attenuator's operational configuration. Reference signs similar to those in FIG. 1 hereby correspond to parts similar to those in FIG. 1.

Figure 3:
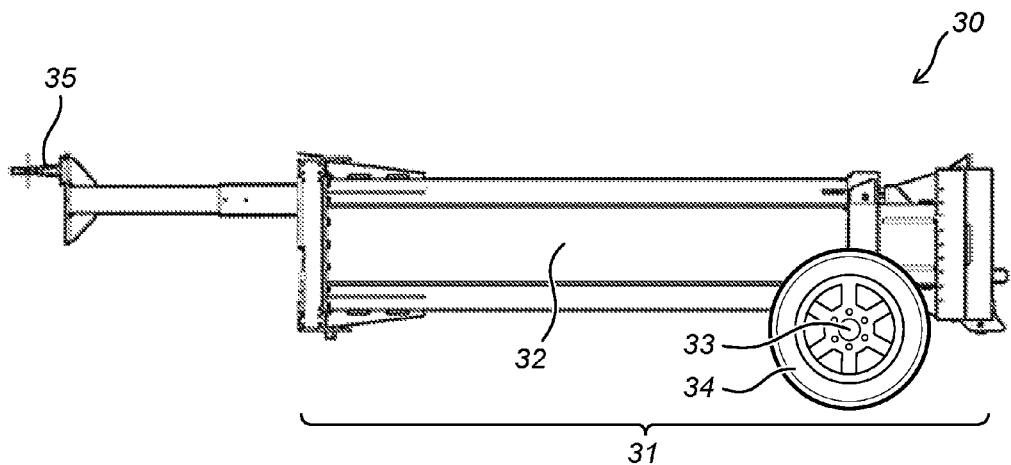
FIG. 3 shows a side elevation of a trailer-implemented impact attenuator according to the specification in a retracted position.

FIG. 3 shows a side elevation of a trailer-implemented impact attenuator 30 according to the specification. The impact attenuator 30 is depicted in a fully retracted position, in which it is most suited for transport. In this embodiment of the specification, the impact attenuator 30 constitutes part of a trailer 31. More specifically, the impact attenuator 30 constitutes (part of) a chassis 32, that provides a mounting point for an axle 33 with a pair of wheels 34 suspended thereto. The trailer 31 can be coupled to a vehicle by means of a common truck coupling 35.

Figure 4:
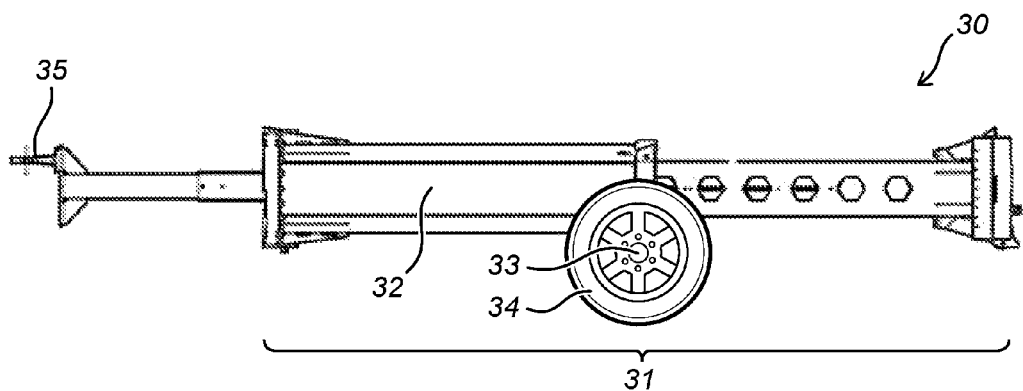
FIG. 4 shows a side elevation of a trailer-implemented impact attenuator according to FIG. 3 in an extended position.

FIG. 4 shows a side elevation of a trailer-implemented impact attenuator 30 according to FIG. 3. The impact attenuator 30 is now depicted in a fully extended position, in which it is most suited for use as a roadside barrier. Reference signs similar to those in FIG. 3 hereby correspond to parts similar to those in FIG. 3.

Figure 5:
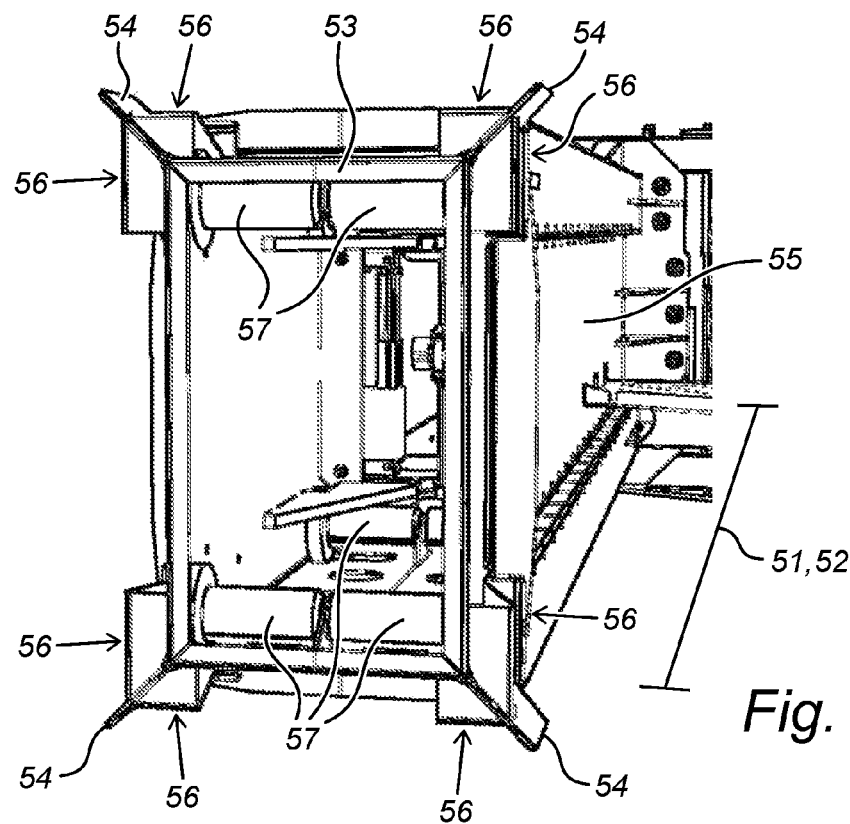
FIG. 5 shows a three-dimensional view of a part of the impact attenuator according to the specification.

FIG. 5 shows a three-dimensional view on a front end of a second part 52 of an energy absorption body 51 of an impact attenuator according to the specification. The front end of a second part 52 of the energy absorption body 51 is provided with second cutting means 53, comprising four second cutting edges 54, for cutting hollow structural section 55 at its vertices, such that essentially flat, bendable, elongated plates result from the splitting action, which plates constitute the sides of the hollow structural section 55. Deflection surfaces 56 are provided next to the cutting edges 54, which are configured for bending the elongated plates away from the colliding object. Rollers 57 are shown, which rollers 57 are contained within the hollow structural sections 55, for guiding a first part (not visible) of the energy absorption body 51.

Figure 6:
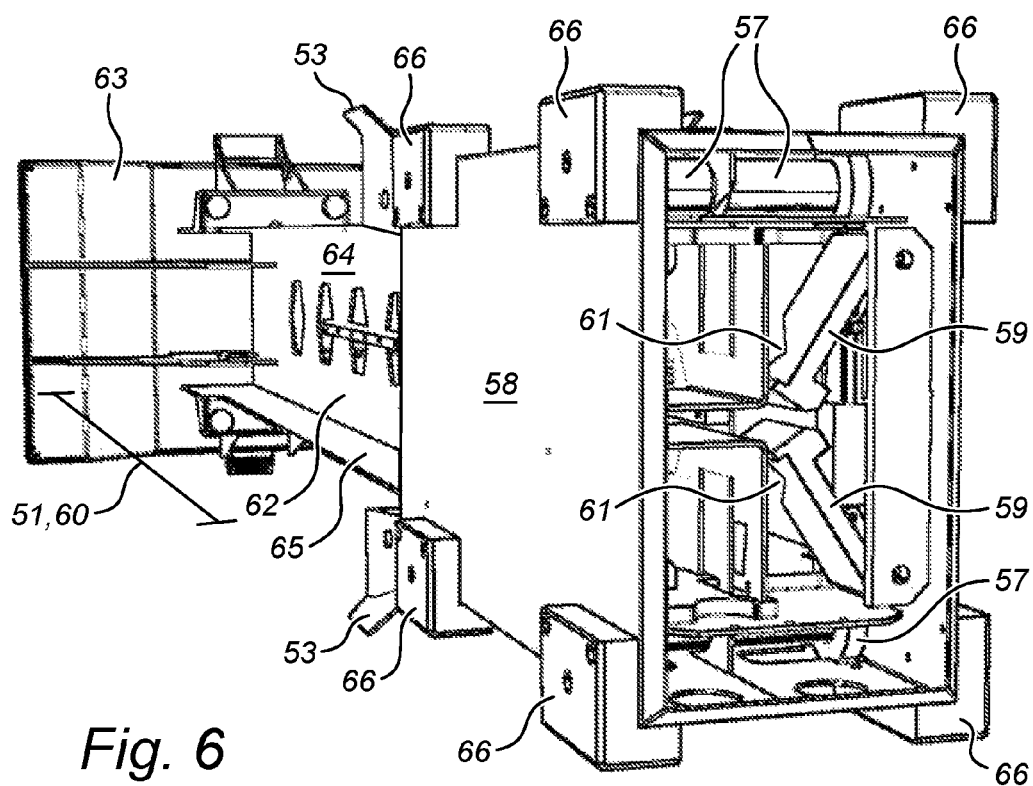
FIG. 6 shows a three-dimensional view of another part of the impact attenuator according to the specification.

FIG. 6 shows a three-dimensional view of a part of the impact attenuator according to the specification, which part comprises a structure 58, contained within the hollow structural section 55 as shown in FIG. 5, which structure 58 houses both the first cutting means 59 and the second cutting means 53. Note that reference signs similar to those in FIG. 5 correspond to parts similar to those in FIG. 5. The structure 58 is configured for guiding the first part 60 of the energy absorption body 51 by means of rollers 57 part the first cutting means 59. The first cutting means 59 comprise first cutting edges 61. In this figure, the first cutting means 59 are depicted in a retracted position wherein the cutting edges 61 keep clear of the H-beam 62 that is the first part 60 of the energy absorption body 51, allowing the H-beam 62 to freely slide along the rollers 57. This allows the user to retract the impact attenuator (for transport) such that the first part 60 of the energy absorption body 51 is substantially contained within the second part of the energy absorption body 51. The structure 58 is on its corners provided with blocks 66 that form-fittingly connect to the shape of the hollow structural section 55 and allow the structure 58 to be guided along the hollow structural section 55, thereby cutting into the hollow structural section 55 by means of the second cutting means 53. To ensure smooth movement of the structure 58 relative to the hollow structural channel 55, either the blocks 66 or the contact surface of the hollow structural channel 55 with the blocks 66 could be at least in part be manufactured from materials with a low coefficient of friction. Alternatively, rollers could be provided between the structure 58 and the hollow structural channel 55. The structure is attached to the hollow structural section 55 by means of shear bolts or pins that are designed to break or shear in the case of a mechanical overload caused by an impact of the impact head 63 with the structure 58.

Figure 7:
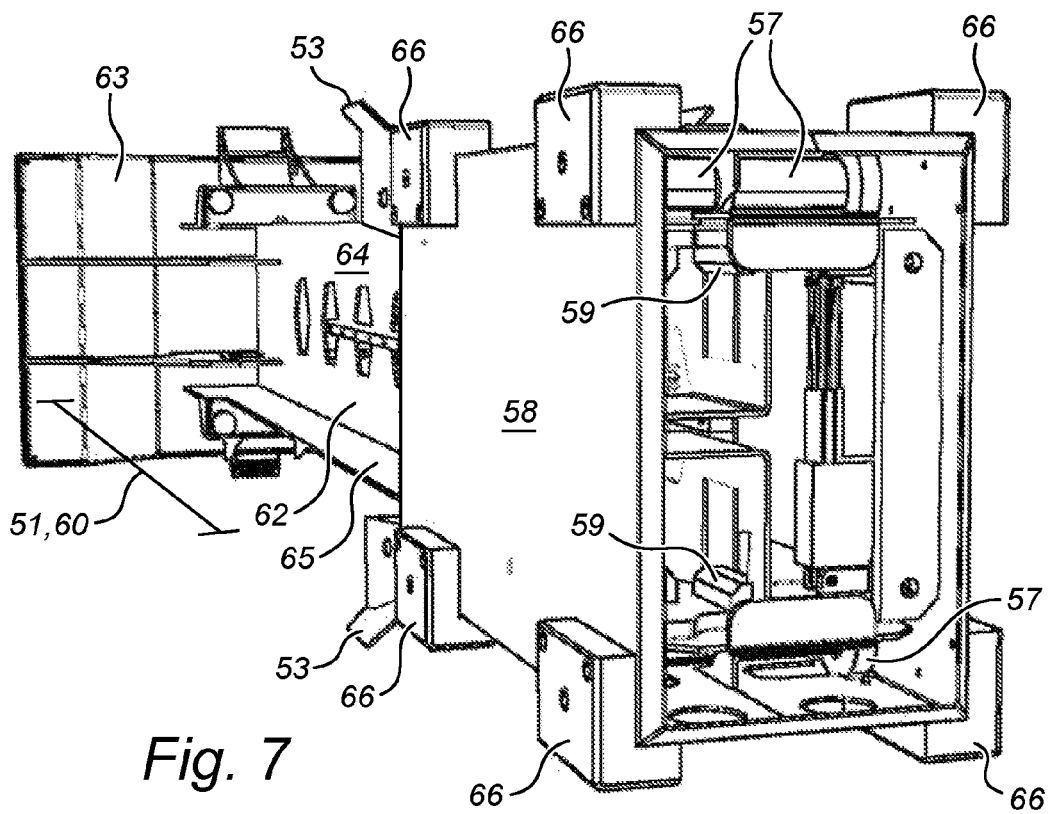
FIG. 7 shows a three-dimensional view of a yet another part of the impact attenuator according to the specification.

FIG. 7 shows a three-dimensional view of a part of the impact attenuator according to the part shown in FIG. 6, wherein similar reference signs correspond to similar parts. Again, a first part 60 of the energy absorption body 51 is shown that is coupled to an impact head 63 at a front end thereof. In this figure, the first cutting means 59 are depicted in an engaged position, wherein upon movement of the first part 60 of the energy absorption body 51, the cutting edges 61 cut into said first part 60 of the energy absorption body 51, splitting the H-beam 62 alongside the interface of the web plate 64 with the flange plates 65.

Figure 8:
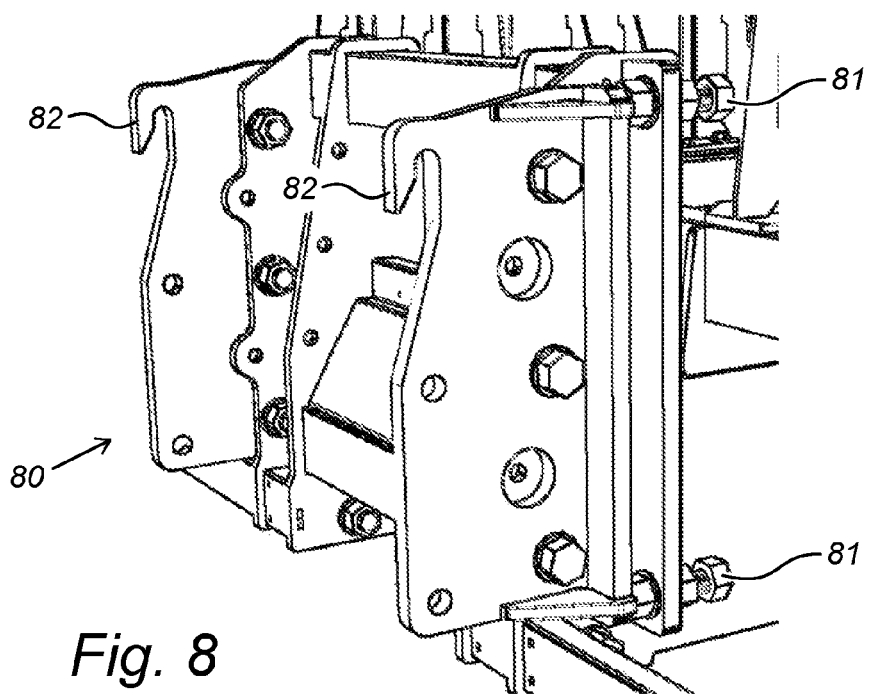
FIG. 8 shows an adjustable coupling for use in an impact attenuator according to the specification.

FIG. 8 shows an adjustable coupling 80 for use in an impact attenuator according to the specification. The adjustable coupling 80 is configured for coupling the impact attenuator to an external structure by means of a pair of brackets 82. The brackets 82 of the coupling allow the impact attenuator to be hooked around a protruding part of the external structure, which brackets 82 therefore provide for a fast and efficient connection of the impact attenuator to said external structure. Moreover, the adjustable coupling 80 allows adjustment of the angle enclosed between the energy absorption body and the external structure by means of jackscrews 81.

Figure 9A:
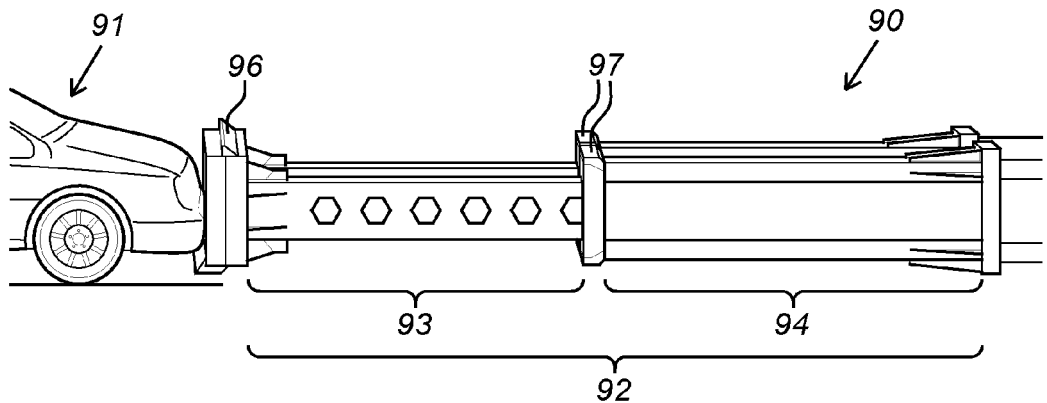
FIG. 9a shows a three-dimensional view of an impact attenuator according to the specification upon impact with a vehicle.
Figure 9B:
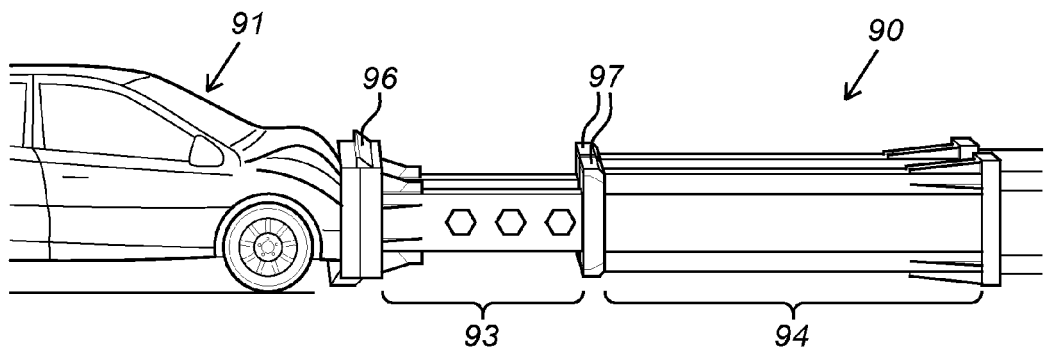
FIG. 9b shows a three-dimensional view of an impact attenuator according to the specification upon impact with a vehicle.
Figure 9C:
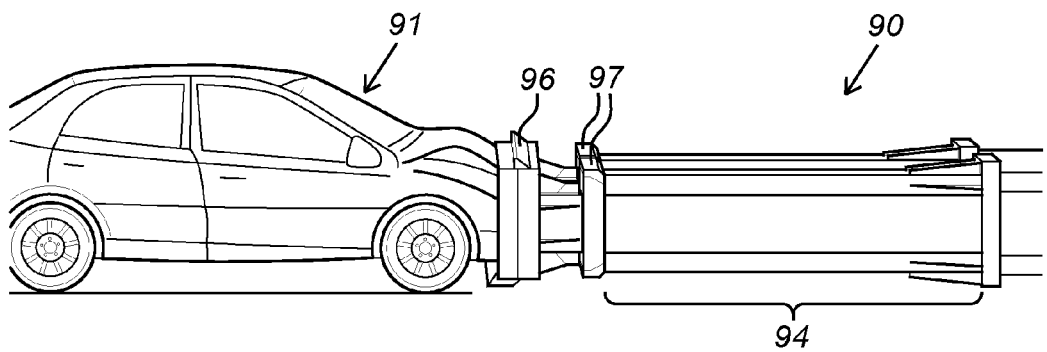
FIG. 9c shows a three-dimensional view of an impact attenuator according to the specification upon impact with a vehicle.
Figure 9D:
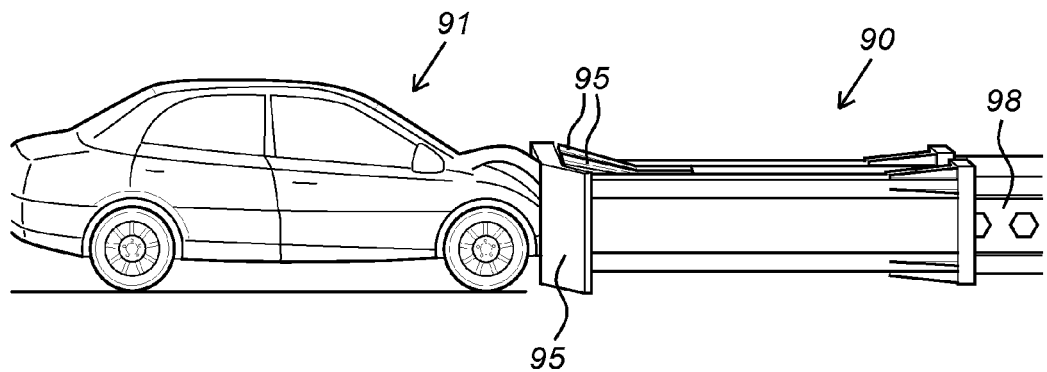
FIG. 9d shows a three-dimensional view of an impact attenuator according to the specification upon impact with a vehicle.
Figure 9E:
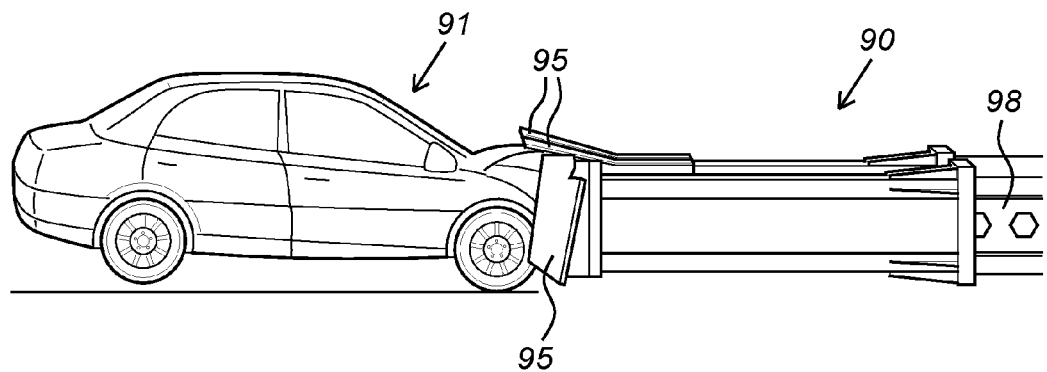
FIG. 9e shows a three-dimensional view of an impact attenuator according to the specification upon impact with a vehicle.

FIG. 9*a*-9*e* show a three-dimensional view of an impact attenuator 90 according to the specification upon impact with a vehicle 91. The figures show a sequence (a-e) of the impact of a collision of the vehicle 91 on the impact attenuator 90. From the sequence it becomes clear that the first part 93 of the energy absorption body 92 is first split and then the second part 94. The first part 93 is split into flat, bendable, elongated plates 98 by means of first cutting means contained within the second part 94. The second part 94 is consecutively split into flat, bendable, elongated plates 95 that are bend away from the colliding vehicle 91 by deflection surfaces provided next to the second cutting means 97 and onto the impact head 96 as described above with reference to FIG. 1 and FIG. 5. FIGS. 9*d* and 9*e* furthermore show that upon splitting of the second part 94 of the energy absorption body 92, the flat, bendable, elongated plates 98 that previously formed the first part 93 of the energy absorption body 92 will protrude past the rear end of the second part 94 of the energy absorption body 92. It is also conceivable that the impact attenuator 90 is, e.g. by means of a different arrangement of the cutting edges, configured for splitting the second part 94 of the energy absorption body 92 before splitting the first part 93 of the energy absorption body 92 upon impact of a vehicle 90 with the impact head 96.

Figure 10:
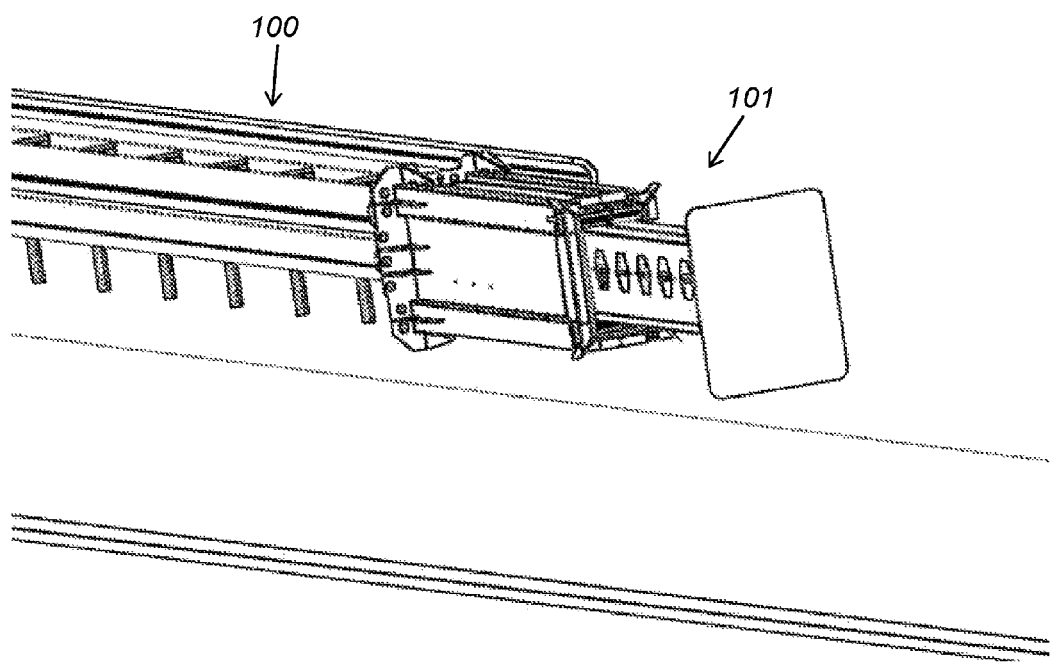
FIG. 10 shows a three-dimensional view of a guardrail comprising an impact attenuator according to the specification.

FIG. 10 shows a three-dimensional view of a guardrail 100 comprising an impact attenuator 101 according to the specification. The guardrail 100 hereby functions as an external structure with which the impact attenuator 101 is coupled. Alternatively, the impact attenuator 101 could be coupled to any other object posing an imminent danger to passing traffic.

It will be apparent that the specification is not limited to the exemplary embodiments shown and described here, but that within the scope of the appended claims numerous variants are possible which will be self-evident to the skilled person in this field. In particular, bursting may be applicable instead of splitting, and H or I beams may be tubes for instance. It is possible here to envisage that different inventive concepts and/or technical measures of the above described embodiment variants can be wholly or partially combined without departing from the inventive concept described in the appended claims.

What is claimed is:

1. An impact attenuator comprising:
    an impact head, coupled to a first end of an energy absorption body, which energy absorption body is arranged for fixation to an external structure at a second end opposing the first end of the energy absorption body, configured to at least partly absorb or dissipate energy from a collision of an object with the impact head, and comprising a first part and a second part extending substantially lengthwise behind each other, wherein the first and second part are mutually moveable;

a first and a second cutting edge, wherein the first cutting edge is arranged for splitting the first part of the energy absorption body upon impact of an object colliding with the impact head, wherein the first cutting edge is moveable between an engaged position where the first cutting edge is positioned for splitting the first part of the energy absorption body upon mutual movement the first part and the second part of the energy absorption body, and a retracted position where the first cutting edge is positioned away from the first part of the energy absorption body to allow free mutual movement the first part and the second part of the energy absorption body; and the second cutting edge is arranged for consecutively splitting the second part of the energy absorption body upon impact of an object colliding with the impact head.

2. The impact attenuator according to claim 1, wherein the first part and the second part of the energy absorption body are mutually moveable in their lengthwise direction.

3. The impact attenuator according to claim 1, wherein the first part and the second part of the energy absorption body are configured for guiding each other during mutual movement of said first part and the second part of the energy absorption body.

4. The impact attenuator according to claim 3, wherein the energy absorption body comprises rollers provided between the first part and the second part of the energy absorption body.

5. The impact attenuator according to claim 1, wherein the first cutting edge and the second cutting edge are provided at an end of the second part of the energy absorption body facing towards the impact head.

6. The impact attenuator according to claim 1, wherein the first part and the second part of the energy absorption body each comprise a thin-walled beam, which thin-walled beams comprise at least a web and a flange plate.

7. The impact attenuator according to claim 6, wherein the first part of the energy absorption body comprises a H-beam and the second part of the energy absorption body comprises a hollow structural section.

8. The impact attenuator according to claim 6, wherein the first and second cutting edges are, by means of relative position to the thin-walled beam of the first part and the second part of the energy absorption body, configured for splitting the thin-walled beams along an interface of a web and flange plate.

9. The impact attenuator according to claim 8, wherein the impact attenuator is provided with at least one deflection surface, configured for deflecting split off beam plates away from a colliding object.

10. The impact attenuator according to claim 1, wherein one of the first part and second part of the energy absorption body is nested within the other one of the first part or second part of the energy absorption body.

11. The impact attenuator according to claim 1, wherein the energy absorption body comprises an adjustable coupling configured for coupling the impact attenuator to an external structure, wherein the adjustable coupling allows adjustment of the angle enclosed between the energy absorption body and the external structure.

12. A vehicle provided on a rear side thereof with an impact attenuator according to claim 1, which impact attenuator is configured to move between:

an essentially horizontal position, wherein the impact attenuator extends substantially parallel to a road surface, and an essentially vertical position, wherein the impact attenuator is folded behind the vehicle.

13. A trailer comprising the impact attenuator of claim 1, wherein the impact attenuator is disposed on at least one axle provided with a set of wheels.

14. A guardrail, provided on a front end thereof with the impact attenuator of claim 1.

* * * * *